United States Patent
Kim et al.

(10) Patent No.: US 7,334,227 B2
(45) Date of Patent: Feb. 19, 2008

(54) DEVICE DRIVER INSTALLING METHOD

(75) Inventors: Yang Gi Kim, Seoul (KR); Sang Il Lee, Goonpo-si (KR)

(73) Assignee: LG Electronics Inc., Seoul (KR)

( * ) Notice: Subject to any disclaimer, the term of this patent is extended or adjusted under 35 U.S.C. 154(b) by 329 days.

(21) Appl. No.: 10/128,226

(22) Filed: Apr. 24, 2002

(65) Prior Publication Data
US 2002/0161939 A1 Oct. 31, 2002

(30) Foreign Application Priority Data
Apr. 25, 2001 (KR) ................ 2001-22457

(51) Int. Cl.
  *G06F 9/445* (2006.01)
  *G06F 3/00* (2006.01)
(52) U.S. Cl. ............ 717/178; 719/327; 717/172; 717/177
(58) Field of Classification Search ........ 717/168–178; 719/327; 713/1; 709/217, 221; 710/8, 15; 705/10
See application file for complete search history.

(56) References Cited

U.S. PATENT DOCUMENTS

| | | | | |
|---|---|---|---|---|
| 5,687,376 A * | 11/1997 | Celi et al. | .................... | 717/127 |
| 6,023,585 A * | 2/2000 | Perlman et al. | .............. | 717/178 |
| 6,026,366 A * | 2/2000 | Grube | ......................... | 705/10 |
| 6,081,850 A * | 6/2000 | Garney | ........................ | 710/15 |
| 6,167,567 A * | 12/2000 | Chiles et al. | ................ | 717/173 |
| 6,473,854 B1 * | 10/2002 | Fleming, III | .................. | 713/1 |
| 6,567,860 B1 * | 5/2003 | Maxwell et al. | ............ | 719/327 |

(Continued)

FOREIGN PATENT DOCUMENTS

JP 10-320209 * 4/1998

(Continued)

OTHER PUBLICATIONS

Araki et al.A non-stop updating technique for device driver programs on the IROS platform, Globalization, 1995 IEEE International Conference on , vol. 1, Jun. 18-22, 1995, pp. 88-92 vol. 1.*

(Continued)

*Primary Examiner*—Wei Zhen
*Assistant Examiner*—Satish S. Rampuria
(74) *Attorney, Agent, or Firm*—Ked & Associates, LLP

(57) ABSTRACT

A method is provided for installing a device driver capable of driving a peripheral device installed in a slot of a PC after receiving the device driver from a server located in a global network. When a PC card device, including a memory in which both a network address of a server providing the device's driver and information identifying the device driver have been stored, is inserted into a slot, network address and the device driver identifying information is read from the memory. Using this information, a request of a download of the device driver from the server with reference to the read-out information is made. The PC then receives the device driver downloaded from the server, and executes the received device driver to enable the peripheral device. With this method, no floppy disk need be supplied with the driver and the URL information is provided in the device, eliminating the need for installation and updating steps by the user.

26 Claims, 6 Drawing Sheets

U.S. PATENT DOCUMENTS

| | | | | |
|---|---|---|---|---|
| 6,728,787 | B1* | 4/2004 | Leigh | 719/327 |
| 7,089,551 | B2* | 8/2006 | Fordemwalt et al. | 717/174 |
| 7,225,440 | B2* | 5/2007 | Himmel et al. | 717/168 |
| 2002/0083431 | A1* | 6/2002 | Machida | 717/174 |
| 2002/0147973 | A1* | 10/2002 | Fordemwalt et al. | 717/174 |
| 2002/0174206 | A1* | 11/2002 | Moyer et al. | 709/221 |
| 2004/0030810 | A1* | 2/2004 | Lozano | 710/8 |
| 2004/0215744 | A1* | 10/2004 | Motoyama et al. | 709/217 |

FOREIGN PATENT DOCUMENTS

| | | | |
|---|---|---|---|
| WO | WO 98/50861 | | 11/1998 |
| WO | WO 00/33232 | * | 6/2000 |
| WO | WO 00/36502 | | 6/2000 |

OTHER PUBLICATIONS

Fan-Tien et al., Enhancement of semiconductor equipment communications using a web-enabled equipment driver, IEEE Transactions on , vol. 14 , Issue: 4, Nov. 2001, pp. 372-380.*

Katayama et al., Proposal of a support system for device driver generation, IEEE, Dec. 7-10, 1999, pp. 494-497.*

Silveira et al., Spontaneous software: a Web-based, object computing paradigm, IEEE, Jun. 4-11, 2000 pp. 719-721.*

Kastner et al., Linux in factory automation? Internet controlling of fieldbus systems!, IEEE, Oct. 18-21, 1999 pp. 27-31 vol. 1.* www.Microsoft.com, http://www.microsoft.com/downloads/Browse.aspx?DisplayLang=en&nr=20&categoryid=3&sortCriteria=date&sortOrder=ascending, pp. 1-4, accessed on Jan. 27, 2006.*

Grammar based modelling and synthesis of device drivers and bus interfaces, O'Nils, M.; Oberg, J.; Jantsch, A. Euromicro Conference, 1998. Proceedings. 24th, vol. 1 Aug. 25-27, 1998, IEEE, pp. 55-58 vol. 1.*

Proposal of a support system for device driver generation,Katayama, T.; Saisho, K.; Fukuda, A., Software Engineering Conference, 1999. (APSEC '99) Proceedings. Sixth Asia Pacific, 1999, IEEE, pp. 494-497.*

Prototype of the device driver generation system for UNIX-like operating systems, Katayama, T.; Saisho, K.; Fukuda, A., Principles of Software Evolution, 2000. Proceedings. International Symposium on, 2000, IEEE,pp. 302-310.*

* cited by examiner

*Conventional Art*

FIG. 4

*ANSI Identifier String Descriptor Format*

| Byte | Field Description | | | | | | | |
|---|---|---|---|---|---|---|---|---|
| | 7 | 6 | 5 | 4 | 3 | 2 | 1 | 0 |
| 0 | 1 = large descriptor | 0000010b = ANSI identifier string descriptor | | | | | | |
| 1 | Defines lower 8 bits of string length. Together with byte2, defines string length of up to 64K | | | | | | | |
| 2 | Defines upper 8 bits of string length. | | | | | | | |
| 3 through N | ANSI text string (up to 64K in length) | | | | | | | |

URL & Device Driver Information

DEVICE DRIVER INSTALLING METHOD

This application claims priority to Korean Patent Application No. 2001-22457 filed Apr. 25, 2001, which is hereby incorporated by reference.

BACKGROUND OF THE INVENTION

1. Field of the Invention

The present invention relates to a device driver installing method, and more particularly, to a method of installing a device driver after downloading the device driver from a server located in a global network.

2. Background of the Related Art

FIG. 1 illustrates a simplified network system in which a plurality of PCs are connected to a server through a network. In the network system of FIG. 1, many PCs 1a, 1b, 1c, ... each have a network accessing card, such as LAN card, and are able to be connected to a server 5 which can provide a variety of information and programs over the network. The information and programs on the servers can be searched for easily and conveniently by a user through an application program such as a Web browser executed by the individual PC. In addition to such searches, other programs or information on the server can be downloaded to the PCs.

As computer technology has matured, various peripheral devices for supporting additional and enhanced computer functions such as multimedia processing functions have been developed. Additionally, the functions of such peripheral devices are being constantly improved. Therefore, there frequently occurs a case that a device driver capable of driving a video or an audio chipset embedded in a peripheral device should be upgraded or updated in order to improve its function or to resolve unexpected errors in operation. For this reason, manufacturers of the peripheral devices usually maintain servers in order that users may obtain upgraded device drivers easily by downloading the necessary device driver from the server over a global network such as the Internet.

When a user of a PC wants to install a peripheral device in his or her PC for the first time, he or she inserts the peripheral device card into an I/O slot equipped in the PC. After installation, the user places a floppy diskette or an optical disk provided by the manufacturer of the peripheral device, into a floppy disk drive or a CD-ROM drive of the PC. The user may then the install program step by step in accordance with installation instructions displayed through pop-up windows on the PC's monitor.

Referring to FIG. 1, if a new device driver with improved functions or error fixes is to be installed in place of a previously installed driver, a user requests a download of the new device driver from the server 5. The downloaded device driver can then be temporally stored on a hard disk or other storage device. The stored device driver is then installed into a kernel of O/S (Operating System) of the PC by the user in accordance with installation instructions displayed through pop-up windows on the PC's monitor.

The related art method of updating drivers has various problems. For example, because the new device driver must be located on the network before it can be downloaded, a user must search the network for a server providing a necessary or upgraded device driver. Because searching a network can be slow, a user can speed up the process by knowing the address such as the URL (Uniform Resource Locator) of the server in advance. However, it is unlikely that all users will know the address of the server.

Another problem with driver download is that a user might install the wrong device driver for a peripheral device because users are not aware of the exact requirements of his or her installed hardware and cannot choose the appropriate device driver from the many stored on the server.

In addition, a floppy diskette or an optical disk provided for installation of a device drive is not used after the first successful installation, therefore, resources are wasted, which unnecessarily increases expenses.

The above references are incorporated by reference herein where appropriate for appropriate teachings of additional or alternative details, features and/or technical background.

SUMMARY OF THE INVENTION

An object of the invention is to substantially solve at least the above problems and/or disadvantages and to provide at least the advantages described hereinafter.

Another object of the present invention is to provide a device driver installing method which automatically downloads a device drive suitable for a new peripheral device inserted into an I/O slot of a PC from a server connected to a network and conduct installation operations of the downloaded device driver.

Another object of the present invention is to reduce the probability that a PC user will install the wrong device in a peripheral device.

Another object of the present invention is to reduce the amount of wasted resources provided to a PC user in relation to a new peripheral device.

In order to achieve at least the above objects in whole or in part, there is provided a method of installing a device driver in a computer, including the steps of checking whether or not a new device is inserted in an I/O bus of the computer, reading out from the new device information required to download a device driver for the new device if a new device is detected, requesting download of the device driver to a server having the device driver with reference to the read-out information, receiving the device driver downloaded from the server, and executing the received device driver to enable the new device.

To further achieve at least the above objects in whole or in parts, there is provided a device to which a device driver installing method in accordance with the present invention is applicable including a memory in which both a network address of a server providing a device driver suitable for the device and information identifying the device driver have been stored.

To further achieve at least the above objects in whole or in parts, there is provided a method of installing a device driver for a peripheral device, including reading out from a peripheral device information required to download a device driver for the peripheral device, requesting download of the device driver from a prescribed server having the peripheral device driver in accordance with the read-out information, receiving the device driver from the server, and executing the received device driver to enable the peripheral device.

To further achieve at least the above objects in whole or in parts, there is provided a peripheral device to be inserted in an I/O slot of a personal computer, including a memory configured to store a network address of a server that provides a device driver suitable for the device and information identifying the device driver, wherein the peripheral device is configured to use a network address information identifying a device driver to select a proper driver from the server.

To further achieve at least the above objects in whole or in parts, there is provided a method of enabling a newly installed peripheral on a device in communication with a network, including reading first prescribed information from the newly installed peripheral, locating a prescribed server on the communication network in accordance with the first prescribed information, downloading second prescribed information from the prescribed server, and enabling the newly installed peripheral in accordance with the second prescribed information.

To further achieve at least the above objects in whole or in parts, there is provided a method of updating a driver of a peripheral installed on a device in communication with a network, including reading first prescribed information from the peripheral, locating a prescribed server on the communication network in accordance with the first prescribed information, downloading second prescribed information from the prescribed server, and updating the peripheral driver in accordance with the second prescribed information.

To further achieve at least the above objects in whole or in parts, there is provided a peripheral configured to couple to a network device, including a memory to store network address and device driver information, and an interface to couple to a network device wherein the peripheral is configured to download a device driver from the network device.

To further achieve at least the above objects in whole or in parts, there is provided a computer-readable medium encoded with executable instructions that can cause a client device with a newly installed peripheral device to perform functions including reading out from the newly installed peripheral device first prescribed information, locating a prescribed server on the network in accordance with the first prescribe information, downloading from the prescribed server second prescribed information, and enabling the newly installed peripheral device in accordance with the second prescribed information.

To further achieve at least the above objects in whole or in parts, there is provided a peripheral device, including a non-volatile memory comprising computer executable code, which when executed by a computer will configure the computer to locate a prescribed server on a network and cause information to be downloaded from the prescribed server to the computer.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 4 shows an example of URL information and device driver identifying information stored in a read-only memory of a hardware device supporting a device driver installing method according to a preferred embodiment of the present invention.

DETAILED DESCRIPTION OF PREFERRED EMBODIMENTS

A preferred embodiment of the invention includes a device driver download method which configures the PC into which the device is installed to download the device driver from a prescribed server over a global network.

Figure 2:
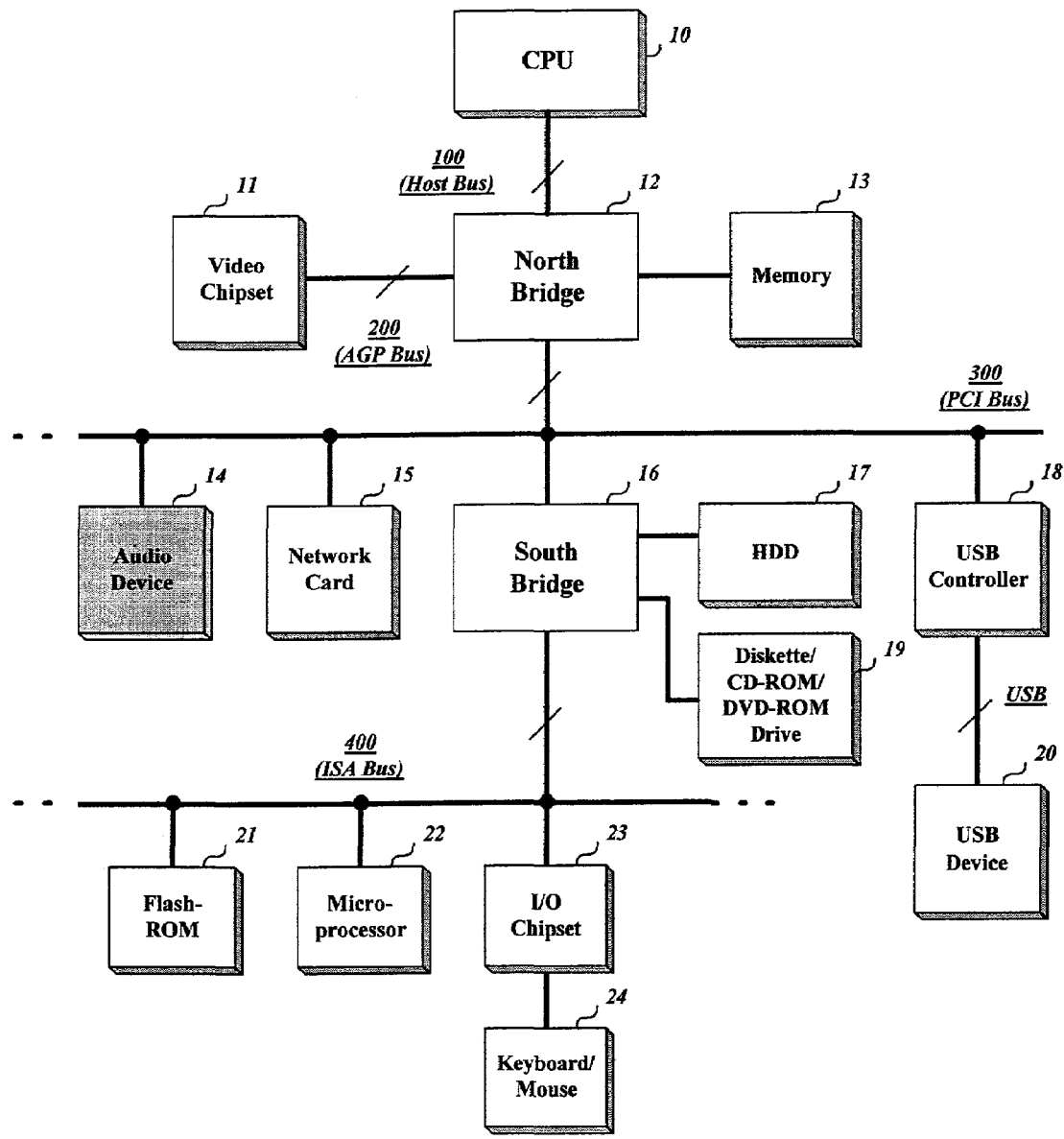
FIG. 2 is a block diagram of a PC in which a device driver installing method in accordance with a preferred embodiment of the present invention is embedded.

FIG. 2 is a block diagram of a PC in which a device driver installing method in accordance with a preferred embodiment of the present invention is embedded. The PC of FIG. 2 preferably includes a CPU 10 conducting ordinary well-known operations and controlling overall functions of the PC. The CPU 10 is connected to a North Bridge 12 through a host bus 100. The North Bridge 12 functions to both assist operations of the CPU 10 and control functions of a PCI (Peripheral Component Interconnect) bus 300. The PC 10 also includes a video chipset 11 for processing video data and outputting the processed data for video presentation. The video chip set 11 is preferably connected to a AGP (Accelerator Graphics Port) bus 200 which is connected to the North Bridge 12. A memory 13 for storing data and programs is also connected to the North Bridge 12. An audio device 14 for processing audio data and sound is connected to the PCT bus 300. Also connected to the PCT bus 300 is a network card 15 for interfacing the PC with the global network, a USB (Universal Serial Bus) controller 18 for communicating with a USB device 20 connected through a USB, and a South Bridge 16 for controlling a high storage capacity device such as a hard disk drive and managing an ISA bus. A hard disk drive 17 and a disk drive 19 for reading and/or writing data to and/or from a CD-ROM disk or a DVD-ROM disk is connected to the ISA bus 400. A flash ROM 21, and an I/O chipset 23 are connected to the ISA bus 400. A microprocessor 22 for controlling I/O operations of devices such as a keyboard or mouse 24 is connected to the I/O chipset 23.

The North Bridge 12 is connected to the CPU 10 through a host bus 100 as shown in FIG. 2, and connects the AGP bus 200 to the video chipset 11. The North Bridge 12 is also connected to the memory 13 and controls reading/writing operations from/to the memory 13. The South Bridge 16 is connected to the North Bridge 12, the audio device 14, the network card 15, and the USB controller 18, through the PCI bus 300. The South Bridge 16 is also connected to the flash ROM 21, the microprocessor 22, and the I/O chipset 23 through the ISA bus 400.

The PC configured as shown in FIG. 2 can preferably detect which devices are connected to the buses 200, 300, and 400 through the North Bridge 12 and the South Bridge 16 when the system is booted or rebooted. Such device detection occurs when the system is booted or rebooted either by switching the power on or off or by a system reset. When the PC is booted or rebooted, it reads the respective device drivers suitable for each detected device from the hard disk drive 17 and executes them one by one. As a result, each detected device is initialized to an enabled state.

During a boot or reboot, the CPU 10 carries out booting and POST process functions. While the PC is being booted or rebooted, if a device, for example, the audio device 14, is detected for the first time on one of the buses, for example, on the PCI bus 300, the CPU 10 conducts a device driver installation operation for the audio device 14 where the audio device 14 has not been registered in a Registry.

The newly detected device, for example, the audio device 14, has stored in its internal ROM either or both a device identifier or/and device driver identifier, and a global network address of a server. The server is preferably capable of providing a device driver compatible with the audio device 14. The device driver is provided in accordance with a device driver installing method in accordance with the preferred embodiment.

Figure 3A:
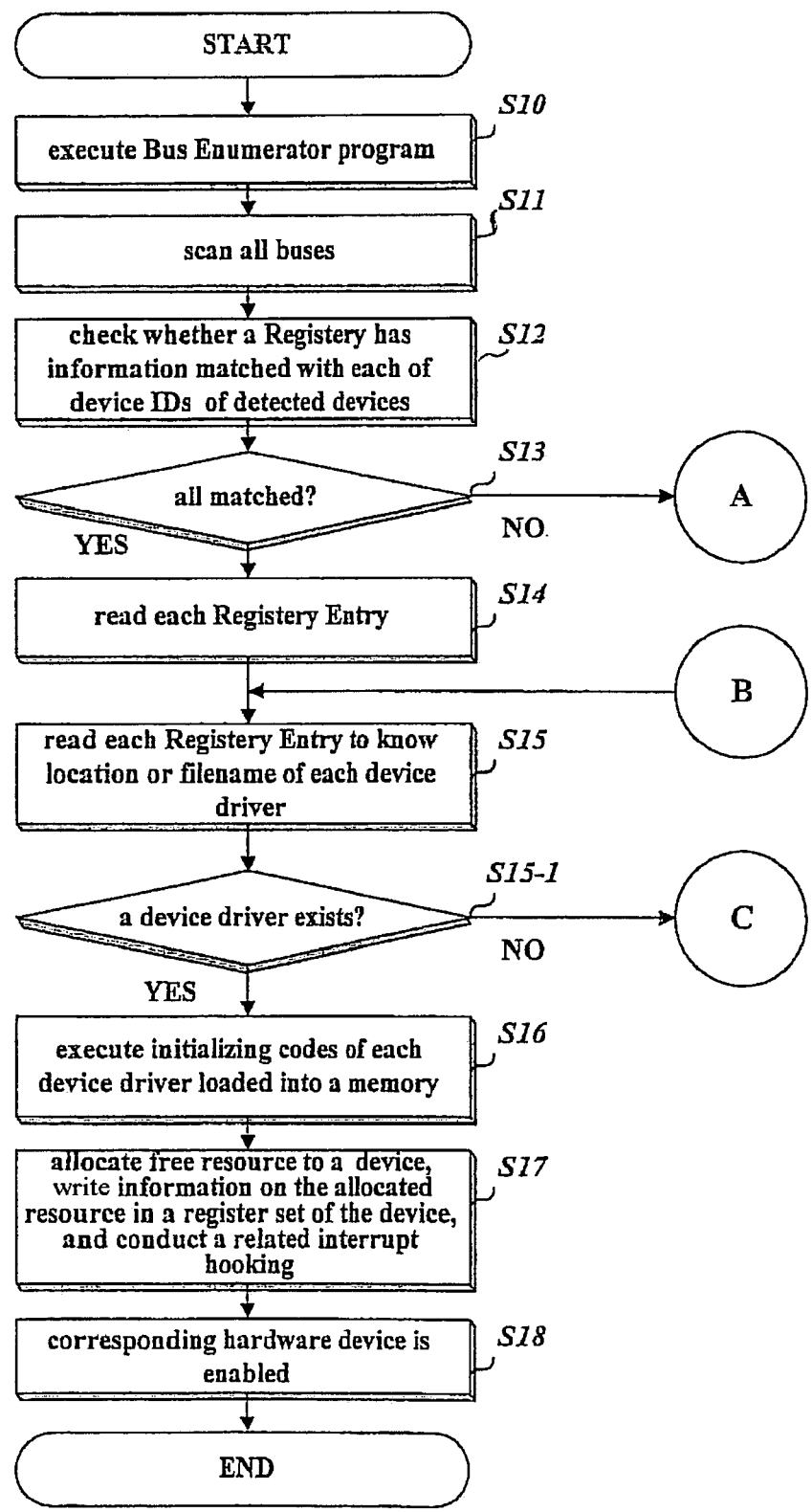
FIGS. 3A and 3B are flow charts of a device driver installing method in accordance with a preferred embodiment of the present invention.
Figure 3B:
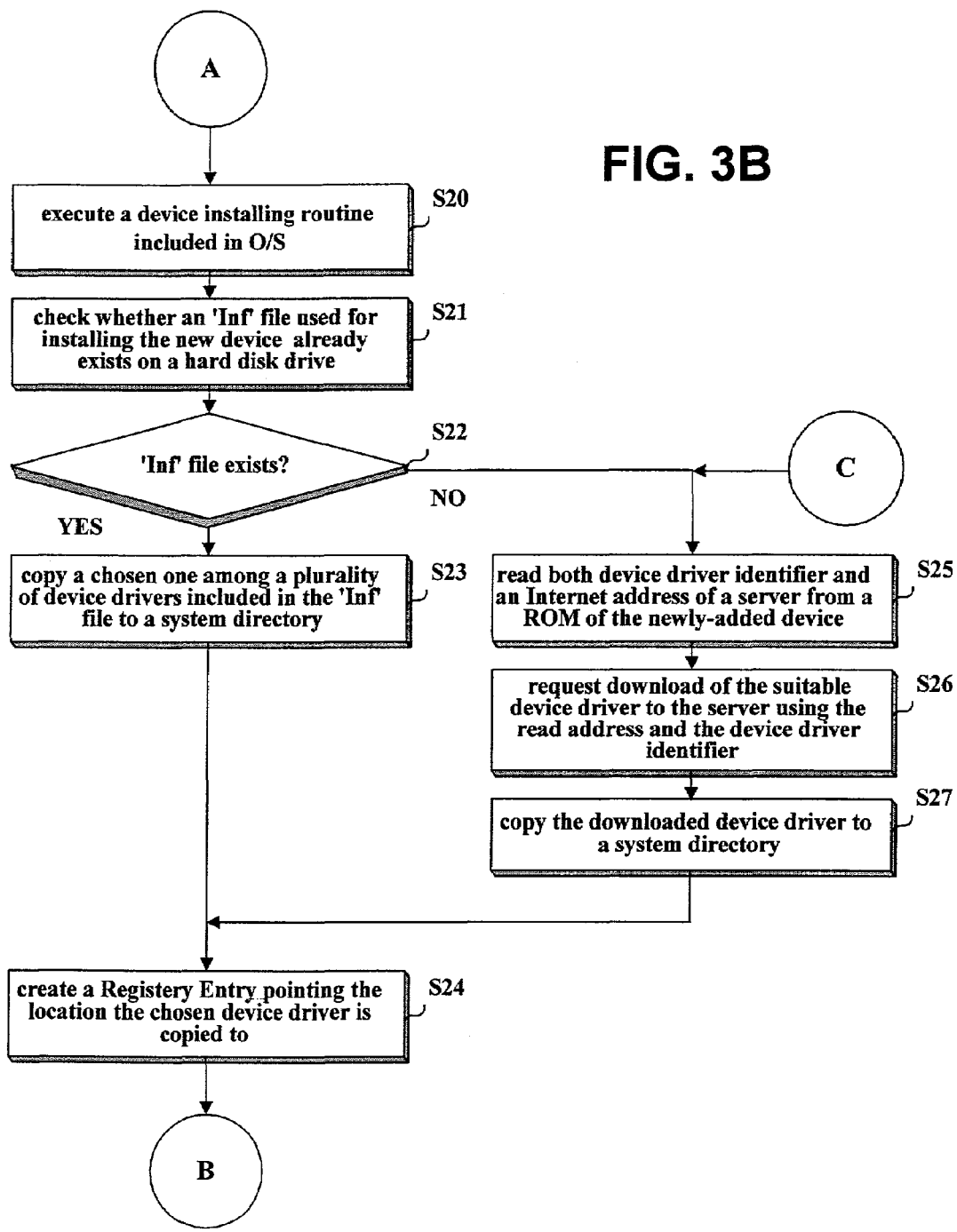

FIGS. 3A and 3B are flow charts showing an example of installing an audio device 14 in accordance with the preferred embodiment. Referring to FIGS. 2 and 3A, when the PC is booted or rebooted by cycling the power switch or by a system reset, the CPU 10 loads an O/S (Operating System), for example, Windows 98 through a booting process. After the O/S is loaded, a CM (Configuration Management) program included in the O/S calls a BE (Bus Enumerator) program (S10) to check whether a new device has been installed on one of the buses.

The BE program called by the O/S scans the PCI and the ISA bus (S11) and reads the individual unique device IDs stored in the ROMs of all the detected devices. The BE program then returns the read device IDs to the CM program. After the CM program receives the IDs, the CM program checks whether a prescribed Registry written on the hard disk drive 17 has information matched with each of the returned (i.e., detected) device IDs (S12).

Upon boot or reboot, if there are no newly-installed devices, all device IDs returned from the BE program are matched with information in each Registry Entry (S13). Therefore, the CM program can read each Registry Entry to determine the location of each device driver on the hard disk drive 17 or the file name of each device driver (S15). For each device driver at the location pointed by the Registry Entry or with a recognized file name (S15), the CM program loads the device driver into the memory 13 and executes it.

If there is not a device driver at the location pointed by the Registry Entry, or there is no device driver matching a file name listed in a pre-specified system directory (S15-1), the CM program proceeds to subroutine C in FIG. 3B which includes the steps of S25, S26, S27 and S24. Subroutine C is a device driver installing procedure and uses information written in the ROM of a newly installed device to download the device driver.

Figure 1:
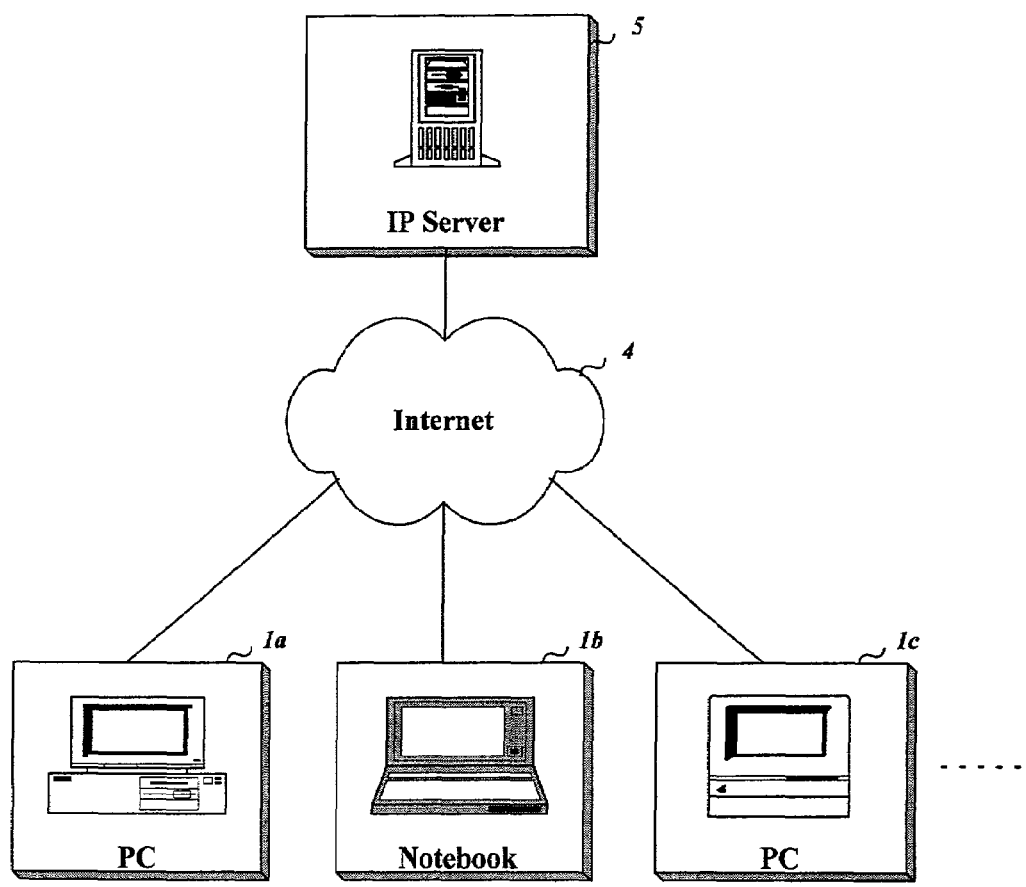
FIG. 1 is a block diagram of a network system in which a plurality of personal computers are connected to a server through a global network.

When the CM program executes subroutine C, the device installing routine reads either a device or device driver identifier and an Internet address of a prescribed server from a ROM of the newly-added audio device 14 (S25). The prescribed server has a device driver of which the filename has been associated with the device or device driver identifier. For example, if the prescribed server is the server 5 in the global network system of FIG. 1, server 5 would have a device driver suitable for the audio device 14. Thus, assuming that a URL indicating a directory of the suitable device driver on server 5 is provided, and the device or device driver identifier is "m9060_driver.dll," the URL and the file name "m9060 driver.dll" would be stored in the ROM of the audio device 14, respectively.

The URL information of the prescribed server and the device or device driver identifier may be written in a field starting at the third byte and running to the $N^{th}$ byte in 'ANSI Identifier String Descriptor Format,' as defined in the standard capable of supporting Plug & Play as shown in FIG. 4. The information is written in text type and may be up to 64K bytes long.

In the second step of subroutine C, the device installing routine requests download of the suitable device driver from server 5 (S26) using the URL information and the device or device driver identifier retrieved from the ROM of the newly-added audio device 14. Then, the PC(1*a*) may download a file identified by the URL and the identifier, namely, "m9060_driver.dll." When the download is received, the device installing routine being run in the PC stores the downloaded file temporarily on the hard disk drive 17.

After download is completed, the device installing routine copies the downloaded file from its temporary location on the hard disk drive 17 to a pre-specified system directory (S27). The device installing routine also creates and writes a Registry Entry indicating the location the file is copied to or the filename of the copied file.

For each device drivers referenced in the Registry Entry and loaded into the memory 13, initializing codes are preferably executed (S16). The initializing code uniquely allocates resources such as I/O address range and memory access range to a corresponding hardware device. The initializing code also writes information on the allocated resource into a register set of the hardware device. Additionally, the initializing code conducts an interrupt hooking (S17). After the initializing codes are completely executed, the corresponding hardware device is enabled (S18).

According to the assumption that the audio device 14 is newly installed as shown in FIG. 2, the device IDs returned by the BE program are not matched one-to-one with the Registry Entries stored in the hard disk drive 17 (S13). In this case, the CM program calls and executes a device installing subroutine illustrated subroutine as A in FIG. 3B as steps S20-S24.

Subroutine A begins with a device installing routine included in the O/S (S20). Next, the subroutine checks whether an "Inf" file used for installing the audio device 14 exists on the hard disk drive 17 (S21).

If the "Inf" file is found on the hard disk drive 17, the device installing routine selects the proper device driver from among the device drivers included in the "Inf" file, and copies it to the pre-specified system directory (S23). The device installing routine also creates a Registry Entry pointing to the location to which the chosen device driver is copied, and writes the created Registry Entry on the hard disk drive 17 (S24). After the device installing routine has finished writing the created Registry Entry to the hard disk drive 17, the subroutine is completed and it returns control to the CM program.

After the Registry Entry referencing the newly installed device is created, the CM program is able to access the device driver written on the hard disk drive 17 with reference to the Registry Entry. Accordingly, the CM program loads the device driver suitable for the audio device 14 into the memory 13 and executes it. When the CM program executes the device driver, successive initializing operations (S16-S18) enabling the audio device 14 are conducted to finish installation of the newly-added device.

If the corresponding 'Inf' file for the audio device 14 is not found (S22) on the hard disk drive 17 or a recording medium inserted in the disk drive 19, subroutine C, described above, is executed.

Once the device driver has been downloaded to the hard disk drive 17, the CM program is able to access it with reference to the Registry Entry created and written as explained above. Accordingly, the CM program loads the device driver suitable for the audio device 14 into the memory 13 and executes it (S15). When the device driver is executed, successive initializing operations (S16-S18) enabling the audio device 14 are conducted to finish installation of the newly-added hardware.

Figure 5:
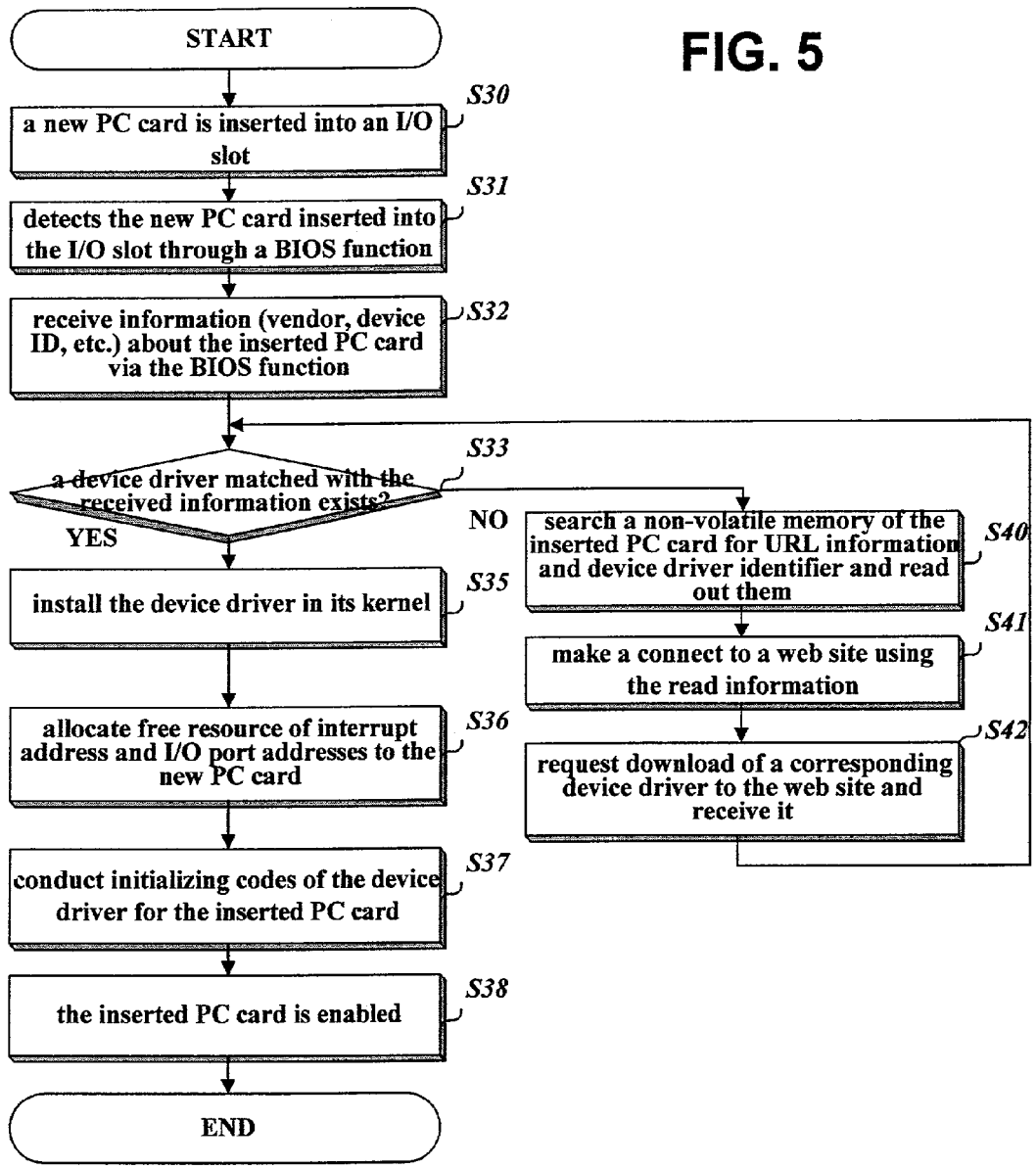
FIG. 5 is a flow chart of a device driver installing method drawn from the standpoint of an O/S of a PC according to a preferred embodiment of the present invention.

FIG. 5 is a flow chart of the above-explained hardware installation procedures redrawn from the standpoint of the O/S of the PC shown in FIG. 2. When a new PC card, such as a LAN, Modem, PC memory, audio device, etc., is inserted into an I/O slot of the PC (S30), the O/S detects the presence of the new PC card. The new PC card can be detected through a PC card service which is a BIOS function for managing PC card slots (S31). Next, the O/S receives information such as vendor, device ID, etc. about the inserted PC card from the PC card service (S32). The O/S then searches the file system of the PC for a device driver matched with the received information (S33).

If the device driver is found in the PC's file system, the O/S installs the device driver in its kernel (S35), and allocates the appropriate free resources such as interrupt address and I/O port addresses (S36). The O/S also initializes the inserted hardware device (S37) associated with the new PC card. As a result, the inserted PC card is enabled and its installation is completed (S38).

If the device driver is not found at step S33, the O/S preferably searches the non-volatile memory of the inserted PC card for the URL information and device or device driver identifier and reads out them (S40). After that, the O/S makes a connection to a web site referenced by the URL using the information from the PC card memory (S41), and requests a download of the corresponding device driver from the web site (S42). After the download is complete, the O/S returns to step S33 to enable the inserted PC card by installing the downloaded device driver into the O/S's kernel. After the driver is installed into the O/S, the PC card and its device driver are completely installed.

The peripheral device driver method of the preferred embodiment has many advantages. For example, when a new peripheral device is added to an I/O bus of a PC, device driver software can be installed without a floppy diskette, an optical disk, or other memory media holding a copy of the device driver.

In addition, when a new version of a device driver, such as a version with upgrades and/or error fixes, for an installed hardware is needed, a user may delete the Registry information associated with the installed hardware or a device driver. Accordingly, if Registry information or old device driver is deleted, the above-explained device driver installing procedure is conducted. Thus, the CM program reads URL information and device or device driver identifier from a ROM of the installed hardware, obtains the device driver of the latest version using the read information, and installs the obtained device driver into O/S kernel without any commands from the operator. Therefore, if device drivers of the latest version have been stored in a server, a device driver for an installed hardware can be automatically updated without operator invention.

Alternatively, if a ROM of an installed hardware device does not have information on the URL and device driver, the device installing routine conducts a conventional installation method. Conventional driver installation methods typically include a pop-up requesting a floppy diskette provided by the hardware vendor be inserted. After the floppy diskette is inserted, it is searched for the device driver to be installed.

Moreover, using the device driver installing method of the present invention makes it unnecessary for the hardware manufacturer to provide an additional floppy diskette or other memory media containing the device driver. Also, by relying on this method, a user need not memorize the URL information of a server storing the necessary device driver and need not manually conduct a download operation from a server.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of installing a device driver for a peripheral device, comprising:

reading out by a processor information from a peripheral device related to downloading a device driver for the peripheral device, wherein the processor generates information required to download the device driver using the information from the peripheral device only;

requesting by the processor a download of the device driver from a prescribed server having the peripheral device driver in accordance with the read information;

receiving the device driver from the server; and executing the received device driver to enable the peripheral device, wherein the information related to downloading the device driver has been written in text type in a non-volatile memory of the peripheral device and comprises a network address of the server and information identifying the device driver, and wherein the network address is a URL and the information identifying the device driver is a filename of the device driver, and wherein said reading, requesting, receiving, and executing are automatically performed for enabling the peripheral device.

2. The method of claim 1, further comprising determining whether the peripheral device is installed in an I/O bus of a PC and whether a driver is installed for the peripheral device.

3. The method of claim 1, further comprising checking whether the device driver for the peripheral device already exists on a computer to which the peripheral device is installed.

4. The method of claim 3, further comprising reading the information required to download the device driver from the non-volatile memory of the peripheral device if the device driver does not exist on the computer.

5. The method of claim 1, further comprising copying the received device driver to a prescribed system directory on a hard disk drive of a computer to which the peripheral is coupled and creating and writing a Registry entry in the computer associated with the copied device driver.

6. The method of claim 5, further comprising loading the device driver indicated by the written Registry entry into a memory of the computer and executing the device driver loaded into the memory to enable the peripheral device by writing information of a unique resource allocated to the peripheral device in at least one register of the peripheral device.

7. The method of claim 1, further comprising copying the device driver to a memory of the peripheral device prior to executing the device driver.

8. The method of claim 7, further comprising writing information of a unique resource allocated to the peripheral device in at least one register of the peripheral device.

9. The method of claim 1, wherein the processor automatically executes the received device driver after the device driver is received.

10. The method of claim 1, further comprising:
receiving a signal from a user to delete information relating to the peripheral device from a registry;
detecting, at a later time, that the information relating to the peripheral device is not included in the registry; and
automatically performing said reading, requesting, receiving, and executing in response to detection that said information is not included in the registry, wherein said reading, requesting, receiving, and executing are automatically performed without a command from the user.

11. The method of claim 10, wherein said later time includes a time when a boot-up operation is performed.

12. The method of claim 10, wherein said later time includes a time when a newer version of the device driver is desired for updating one or more operations for the peripheral device.

13. A method of enabling a peripheral device on a device in communication with a network, comprising:
reading first prescribed information from the peripheral device, wherein the first prescribed information is generated using information from the peripheral device only;
locating a prescribed server on the network in accordance with the first prescribed information;
downloading second prescribed information from the prescribed server; and
enabling the peripheral device in accordance with the second prescribed information,
wherein the first prescribed information is written in text type in a non-volatile memory of the peripheral device and comprises a network address of the prescribed server containing a device driver for the peripheral device and information identifying the device driver for the peripheral device, wherein the network address comprises a URL and the information identifying the device driver for the peripheral device comprise a filename of the device driver, and wherein said reading, locating, downloading, and enabling are automatically performed.

14. The method of claim 13, further comprising downloading from the prescribed server the second prescribed information in accordance with the first prescribed information.

15. The method of claim 14, wherein the device in communication with the network is a PC.

16. The method of claim 13, further comprising determining whether the peripheral device is newly installed on the device in communication with the network.

17. The method of claim 13, further comprising
determining whether the second prescribed information is stored in a first memory of the device in communication with the network, and
enabling the peripheral device with the second prescribed information from the first memory if the second prescribed information is located in the first memory.

18. The method of claim 17, wherein the first memory comprises at least one of a floppy disk, an optical storage disk, a hard disk, and read only memory (ROM).

19. The method claim 17, further comprising storing the downloaded second prescribed information in a memory of the device in communication with the network.

20. The method of claim 17, further comprising upon enabling the peripheral creating and writing a registry entry associated with the peripheral device.

21. The method of claim 17, wherein the second prescribed information comprises a driver for the newly installed peripheral device and executable instructions for installing the driver for the newly installed peripheral device.

22. The method of claim 21, wherein the second prescribed information is a peripheral device driver.

23. The method of claim 21, wherein the network comprises a global network.

24. The method of claim 13, further comprising:
receiving a signal from a user to delete information relating to the peripheral device from a registry;
detecting, at a later time, that the information relating to the peripheral device is not included in the registry; and
automatically performing said reading, locating, downloading, and enabling in response to detection that said information is not included in the registry, wherein said reading, locating, downloading, and enabling are automatically performed without a command from the user.

25. The method of claim 24, wherein said later time includes a time when a boot-up operation is performed.

26. The method of claim 24, wherein said later time includes a time when a newer version of the device driver is desired for updating one or more operations for the peripheral device.

* * * * *